United States Patent
Lesjak et al.

(10) Patent No.: US 7,216,550 B2
(45) Date of Patent: May 15, 2007

(54) DEVICE AND METHOD FOR OPERATING A CORIOLIS MASS FLOWMETER

(75) Inventors: Ralf Lesjak, Rosdorf (DE); Rene Friedrichs, Ladenburg (DE); Jorg Gebhardt, Mainz (DE); Steffen Keller, Karlsruhe (DE); Frank Kassubek, Rheinfelden (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/972,673

(22) Filed: Oct. 26, 2004

(65) Prior Publication Data
US 2005/0125167 A1 Jun. 9, 2005

(30) Foreign Application Priority Data
Oct. 31, 2003 (DE) ................................ 103 51 310

(51) Int. Cl.
*G01F 1/84* (2006.01)
(52) U.S. Cl. ............................. 73/861.356; 73/861.357
(58) Field of Classification Search .... 73/861.354–357
See application file for complete search history.

(56) References Cited

U.S. PATENT DOCUMENTS

| | | | | |
|---|---|---|---|---|
| 5,069,075 A | * | 12/1991 | Hansen et al. | 73/861.357 |
| 5,321,991 A | * | 6/1994 | Kalotay | 73/861.357 |
| 5,576,500 A | * | 11/1996 | Cage et al. | 73/861.357 |
| 6,758,103 B2 | * | 7/2004 | Hansen | 73/861.357 |
| 6,834,557 B2 | * | 12/2004 | Matt | 73/861.357 |

FOREIGN PATENT DOCUMENTS

WO    WO 98/52000 A2    11/1998

\* cited by examiner

*Primary Examiner*—Harshad Patel
(74) *Attorney, Agent, or Firm*—Buchanan Ingersoll & Rooney PC

(57) ABSTRACT

A device and a method for operating a Coriolis mass flowmeter with at least one measuring pipe, wherein at least two operative assemblies, which can respectively be operated as an exciter (actuator) and/or as a measuring signal pickup (sensor), are attached to the measuring pipe. The operative assemblies are formed as plunger-type armature sensors with a magnetic core. Each operative assembly is operated either as a sensor or as an actuator or simultaneously as an actuator and as a sensor. Each operative assembly is switched over between the operating mode as a sensor and as an actuator by a switch assigned to it.

26 Claims, 2 Drawing Sheets

DEVICE AND METHOD FOR OPERATING A CORIOLIS MASS FLOWMETER

Figure 1:
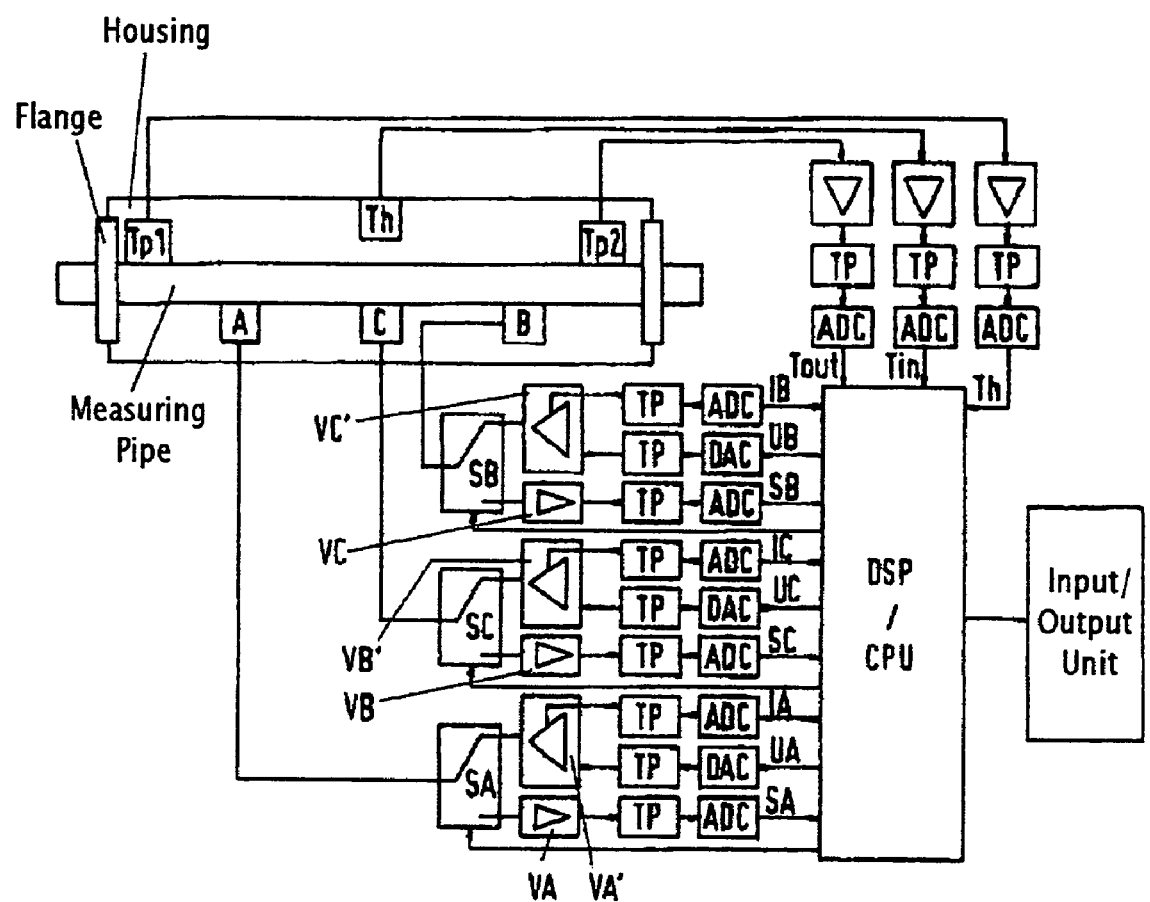

The invention relates to a device and a method for operating a Coriolis mass flowmeter, according to the pre-characterizing clause of claim 1.

A known method is that the flow pickup has two sensors for recording the motion of the measuring pipe and an actuator for the mechanical excitation of the measuring pipe.

Furthermore, there is also a sensor for measuring the temperature of the measuring pipe and sometimes a sensor for measuring the temperature of the housing.

In WO 98/52000 there is a description of a method and a device for detecting and compensating zero point influences on Coriolis mass flowmeters in which there are three sensors for recording the motion of the measuring pipe and an actuator for the mechanical excitation of the measuring pipe.

In the known arrangements, the sensor coils are used for recording the motion of the measuring pipe and the actuator coil is used for generating the force for the vibration of the measuring pipe. The complexity and probability of defects in the device increase with the number of actuators and sensors that are used.

The object of the invention is to provide a simplified device and a simplified method for a Coriolis mass flowmeter.

The object is achieved with regard to the device by the characterizing features of claim 1 and with regard to the method by the characterizing features of claim 9. According to the invention, therefore, at least two operative assemblies, which can respectively be operated as an exciter (actuator) and/or as a measuring signal pickup (sensor), are attached to the measuring pipe.

In a particularly advantageous embodiment, the operative assemblies are formed as plunger-type armature sensors, with in each case a coil and a magnetic core which can be displaced in it. As is known, such a plunger-type armature sensor works in such a way that when the sensor is in operation a displacement of the magnetic core induces a voltage in the coil, whereas when the actuator is in operation the application of an AC voltage to the coil makes the magnetic core undergo periodic oscillations.

In the arrangement according to the invention, each coil may be used either as a sensor for recording the motion of the measuring pipe or as an actuator for generating the force for the vibration of the measuring pipe.

This makes it possible to operate the measuring pipe in different modes of oscillation.

Furthermore, the coil can be used simultaneously as an actuator and a sensor by utilizing the phase information between voltage and current.

Furthermore, there is redundancy, so that the measuring device continues to work even after failure of a sensor/actuator. The operator can be informed of the momentary emergency operation by means of a warning, and consequently has the possibility of preparing a replacement or a repair.

The possibility of measuring the current and voltage of each sensor/actuator makes it possible to determine the resistance of the coil. In this way, detection of a cable rupture or a temperature measurement is possible. (The resistance of the copper changes in dependence on the temperature)

Since the analog-digital converters are synchronized, a measurement of the time shift between the current and voltage of the actuator, but also between the actuator and the sensor, is possible.

In a particularly important and simple arrangement, each individual coil can be used simultaneously as an actuator and a sensor. For this purpose, both the amplitude and the phase of the respective coil current are measured. The phase relationship and the amplitude ratio between the applied actuator voltage and the coil current can be used to calculate the voltage induced by the motion of the measuring pipe. Obtained from this in particular is the phase of the vibration of the measuring pipe.

The described simultaneous use of the coils as an actuator and a sensor allows the flowmeter also to operate with a total of only two coils.

A first way of realizing this could be simply to omit the actuators from the existing devices (prior art). However, other arrangements are possibly conceivable. The position of the now only two coils can be optimized for example both with respect to the sensor function and with respect to the actuator function. (Sensors should be removed as far as possible from the center of the device, in order to comprise a great phase shift. On the other hand, the actuators transfer their force optimally when they are fitted as close to the center as possible.)

On the device there are possibly positions with maximum possible e.m.f., that is maximum possible deflection, which do not lie at the center of the device.

Furthermore, it should be taken into consideration that this arrangement imposes particular requirements on the forms of the coils and magnets. For instance, in the prior art devices, there are generally linear drive and sensor motors of different designs.

One possible embodiment of the invention is represented in FIG. 1.

A, C, B are the sensor coils, which however can similarly be used as actuators.

The further components shown in FIG. 1 are:

| | |
|---|---|
| DSP/CPU: | digital signal processor/central processing unit (microprocessor) |
| ADC: | analog-digital converters |
| DAC: | digital-analog converters |
| TP: | lowpass filters |
| SA, SB, SC: | switches for sensor/actuator A, B, C |
| Tp1, Tp2, Th: | temperature sensors for recording the pipe temperature (Tp1, Tp2) or the ambient temperature (Th) |
| VA, VA', VB, VB', VC, VC': | amplifiers |
| SA, SB, SC: | sensor signal from sensor/actuator unit A, B, C |
| UA, UB, UC: | activating voltage for sensor/actuator unit A, B, C |
| IA, IB, IC: | ammeter of sensor/actuator unit A, B, C |

The switching between the operating modes as a sensor or as an actuator takes place for the respective sensor coil A, B or C by means of the switches SA, SB and SC, controlled by the DSP.

Sensor operation: During operation as a sensor, the induced sensor voltage is amplified with the aid of an input amplifier, band-limited (anti-aliasing filter) and subsequently fed to an ADC. In the example of FIG. 1, for example, the sensor signal of the coil A is fed via the switch SA to the amplifier VA, amplified there, fed to the lowpass filter TP and after that fed to the analog-digital converter ADC, after which the sensor signal SA pre-processed in such a way is then fed to the DSP in the digital signal processor for further processing. The signal processing in the corresponding paths for the coils C and B takes place analogously.

During operation as a sensor, the switches SA, SB and SC are not in the switching position shown in FIG. 1 but correspondingly in the other switching position.

Actuator Operation:

If the sensor coils A, B, C are to be operated as actuators, the switches SA, SB and SC are brought into the switching position shown in FIG. 1, controlled by a signal from the digital signal processor DSP, as indicated by the corresponding arrow connection. From the digital signal processor, the respective setpoint value for the coil voltage UA, UB, UC is output and a digital-analog converter DAC is used to generate from it a sinusoidal signal, which is band-limited with the aid of a downstream lowpass filter TP and after that applied via a correspondingly assigned power amplifier VA', VB', VC' to the respective actuator coil A, B or C.

At the same time, the actuator current is recovered from the amplifiers VA', VB', VC', initially band-limited by means of a lowpass filter TP and after that digitized by means of an analog-digital converter ADC and fed as a measured current value IA, IB or IC, respectively, to the digital signal processor for further evaluation.

The analog-digital converters are in this case synchronized, so that at any time the information on the phase relationships between the respective actuator current IA, IB or IC and the respective actuator voltage UA, UB or UC is known.

Furthermore, at least one measurement of the measuring pipe temperature (Tp1, Tp2) and a further measurement of the housing temperature (Th) may also take place. As represented at the top right in FIG. 1, the measured values of the aforementioned temperature sensors are also fed via corresponding preamplifiers, lowpass filters and analog-digital converters as temperature signals to the digital signal processor for further processing.

The program stored in the digital signal processor then determines which of the three coils A, B, C are operated as actuators and which as sensors. For example, the coil C may be operated as an actuator; the switch SC would then be in the position indicated in FIG. 1. The two other coils A, B could then be operated as sensor coils; the corresponding switches SA and SB would then be in the other switching position.

An appropriate operating state may also be, however, one in which the coil A is operated as an actuator and the coils C and B are operated as sensors. The switch SA would then be in its switching position represented in FIG. 1, and the switches SB and SC would in each case be in the other switching position.

Overall, however, in the case of the embodiment according to FIG. 1 each coil can only be operated in one preselected operating mode, that is either as an actuator or as a sensor.

Figure 2:
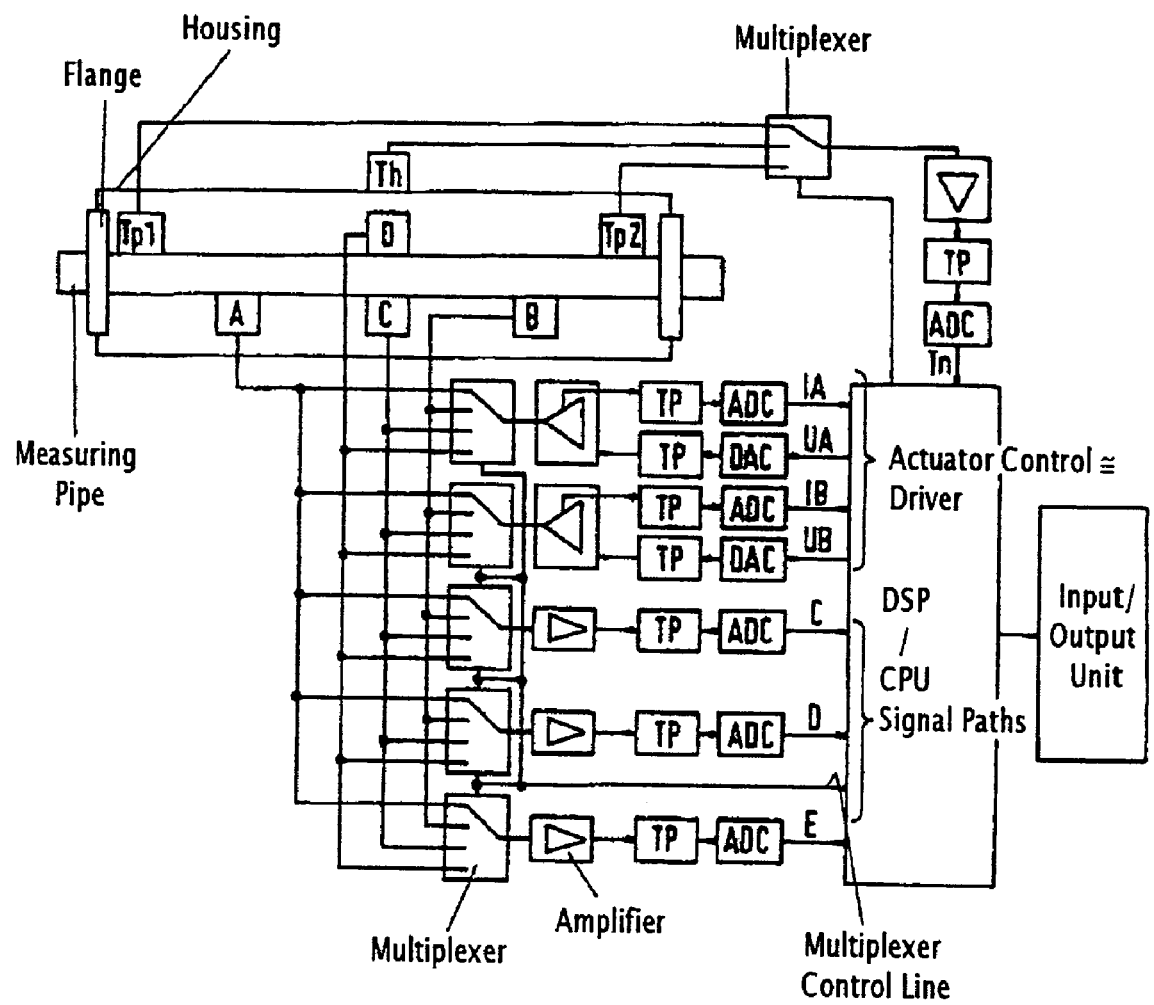

A further possible embodiment of the invention is represented in FIG. 2. In the embodiment according to FIG. 2, the assignment of the respective operating mode for one of the coils, that is whether it is operated as a sensor or as an actuator, can be handled much more flexibly than in the embodiment according to FIG. 1. A further difference is that, in the embodiment according to FIG. 2, four coils, namely A, B, C, D, are attached to the measuring pipe. The temperature sensors Tp1 and Tp2 for recording the temperature of the pipe at the pipe inlet and at the pipe outlet and also the temperature sensor Th for recording the housing temperature are also again provided in the embodiment according to FIG. 2. As a difference from FIG. 1, however, there is only one signal recording path—amplifier, lowpass filter TP, analog-digital converter ADC—for recording the temperature signals; see top right of FIG. 2. A multiplexer ensures that, under the control of the digital signal processor DSP via a corresponding line of action between the digital signal processor and this multiplexer, the temperature signals of the three temperature sensors Tp1, Tp2, Th can in turn be respectively inquired. This embodiment saves a number of components, since the temperature sensor/signal recording path only needs to be provided once.

In the embodiment according to FIG. 2, by contrast with the embodiment according to FIG. 1 with the relatively fixed assignment represented there of the operating mode of a coil, the assignment of the operating modes of the individual coils is realized by means of multiplexers. The actuator activating drivers, which comprise voltage paths—voltage signal U, digital-analog converter DAC, lowpass filter TP, amplifier—and the corresponding returns of the current signal—via a further lowpass filter TP, analog-digital conversion by means of an analog-digital converter ADC to the current signal I—, correspond to those already described under FIG. 1. In the embodiment according to FIG. 2, two such driver circuits for actuator activation are provided, designated by UA and IA, respectively, and by UB and IB, respectively. By means of a respective multiplexer assigned to the amplifier, the actuator activating voltage can then be assigned to each of the four coils A, B, C, D. Which of the respective coils is assigned the actuator activating voltage is decided on the basis of the program provided in the digital signal processor DSP. The selection and activation of the multiplexers takes place via a multiplexer control line. In this way, a very flexible selection of the operating mode is possible for each of the four coils.

Represented underneath the actuator activating drivers in FIG. 2 are three signal paths for recording the sensor voltage of a coil. As already described above under FIG. 1, the signal paths comprise an amplifier, a lowpass filter and an analog-digital converter ADC. Here, too, in the embodiment according to FIG. 2, a multiplexer is assigned to a signal path in each case between the amplifier and the respective coils. The signal-path multiplexers are also activated and selected via the multiplexer control line. In this way it is possible to switch each of the four coils very flexibly to each of the three signal paths, depending on how this is provided in the program stored in the digital signal processor. As a result, the operation of the device can be handled very flexibly overall.

A further advantage of the embodiment according to FIG. 2 is that it is now possible to operate a coil simultaneously both as an actuator and as a sensor. This arises under consideration of the description presented above.

This is so because it is possible, for example by means of the actuator activation path UA/IA, to activate the coil A as an actuator and at the same time record the coil signal via the signal path C as a sensor signal, if the two multiplexers involved are switched correspondingly.

One possible appropriate sequence for activating the four coils A, B, C, D could be for example that the coils A and B are operated as actuator coils, the coils C and D are operated as sensor coils, and shortly after that the coils C and D are operated as actuator coils and the coils A and B are operated as sensor coils.

The electronic assemblies indicated in the exemplary embodiments of FIGS. 1 and 2, such as for example amplifiers, multiplexers, lowpass filters, analog-digital converters and digital-analog converters, are otherwise known electronic assemblies and are produced according to the state of the art with the most modern components, but to this extent are available to a person skilled in the art. The same applies to the digital signal processor DSP represented.

The invention claimed is:

1. Device for operating a Coriolis mass flowmeter with at least one measuring pipe, comprising at least one operative assembly configured to simultaneously operate as an exciter (actuator) and as a measuring signal pickup (sensor), attached to the measuring pipe;
wherein the at least one operative assembly is formed as a plunger-type armature device with a magnetic core;
further comprising;
a means to measure a sensor signal voltage;
a means to apply actuator voltage; and
a means to measure actuator current.

2. Device according to claim 1, wherein each of the operative assemblies is assigned its own means to measure the sensor signal voltage, to apply an actuator voltage, and measure the actuator current.

3. Device according to claim 2, wherein each operative assembly can be operated as an actuator and as a sensor.

4. Device according to claim 1, wherein a plurality of the operative assemblies share common means to measure the sensor signal voltage, to apply the actuator voltage, and to measure the actuator current, the assignment of the common means to the respective operative assemblies being coordinated by means of multiplexer switches.

5. Device according to claim 1, wherein each operative assembly is operated simultaneously as a sensor and as an actuator.

6. Device according to claim 5, wherein phase signal induced by the measuring pipe is determined from amplitude ratio and phase relationship between the applied actuator voltage and the measured actuator current.

7. Device according to claim 1, each operative assembly can be switched over between the operating mode as a sensor and as an actuator by a switch assigned to it.

8. Device according to claim 1, wherein, each operative assembly is assigned at least one preamplifier a lowpass filter and an analog digital converter.

9. Device according to claim 1, wherein, for activation each operative assembly is assigned at least one preamplifier digital analog converter, a voltage signal generator assembly, a lowpass filter and an analog digital converter.

10. Device according to claim 1, wherein coil resistance of the operative assembly is determined from the applied actuator voltage and the measured actuator current.

11. Device according to claim 1, wherein analog/digital converters are synchronized, so that phase of time shift between actuator current and actuator voltage signal of one operative assembly can be determined as well as phase or time shift between actuator and sensor signals of different operative i.e. assemblies.

12. Device according to claim 1, wherein switches, ADCs and DACs are connected to a microprocessor.

13. Method for operating a Coriolis mass flowmeter with at least one measuring pipe, wherein at least one operative assembly is attached to the measuring pipe and the at least one operative assembly is operated simultaneously as an exciter (actuator) and as a measuring signal pickup (sensor), comprising;
measuring a sensor signal voltage;
applying actuator voltage; and
measuring actuator current, the actuator current due to the applied actuator voltage.

14. Method according to claim 13, wherein the operative assemblies are operated as plunger-type armature sensors.

15. Method according to claim 13 wherein each operative assembly can be switched over between sensor operation and actuator operation by a switch controlled by a microprocessor.

16. Method according to,i.e claim 15, wherein, the signal voltage is amplified, filtered, and digitized in an ADC, and is fed to a microprocessor.

17. Method according, to claim 13, wherein, a sinusoidal signal is generated by a DAC, band-limited with the aid of a lowpass filter, and after that, is applied via a power amplifier to the coil of the operative assembly.

18. Method according to claim 17 wherein the armature current is measured by means of a further ADC and fed to a microprocessor.

19. Method according to claim 13, wherein temperature of the pipe and/or a housing is measured.

20. Method according to, i.e. claim 13, wherein each individual operative assembly is operated simultaneously as an actuator and a sensor.

21. Method according to claim 20, wherein both the amplitude and the phase of the respective coil current are measured, and the amplitude ratio between the applied actuator voltage and the coil current is used to calculate the voltage induced by the oscillation of the measuring pipe.

22. Method according to claim 13, wherein the method is controlled by a microprocessor.

23. Method according to claim 13, wherein a device temperature is determined for coil resistance.

24. Method according to claim 13, wherein a cable rupture is determined from coil pressure.

25. Device for operating a Coriolis mass flowmeter with at least one measuring pipe, comprising;
at least one operative assembly, which is configured to simultaneously operate as an actuator and as a measuring signal sensor and which is attached to the measuring pipe;
wherein the at least one operative assembly is formed as a plunger-type armature sensor with a magnetic core;
a means to measure a sensor signal voltage;
a means to apply actuator voltage; and
a means to measure actuator current, the actuator current corresponding to the actuator voltage.

26. The device of claims 25, comprising:
a switch for switching between the operation of applying actuator voltage and the operation of measuring the actuator current.

* * * * *